United States Patent
Neumeier

(10) Patent No.: US 7,168,900 B2
(45) Date of Patent: Jan. 30, 2007

(54) TOTAL SUPPORT WITH A COLLET CHUCK RECEIVER

(75) Inventor: Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 0 days.

(21) Appl. No.: 11/270,700

(22) Filed: Nov. 9, 2005

(65) Prior Publication Data

US 2006/0056932 A1    Mar. 16, 2006

Related U.S. Application Data

(63) Continuation of application No. 10/427,058, filed on Apr. 30, 2003, now abandoned.

(30) Foreign Application Priority Data

May 2, 2002    (DE) .................................. 102 19 600

(51) Int. Cl.
*B23B 31/00* (2006.01)
*B23B 31/20* (2006.01)

(52) U.S. Cl. ..................... 409/232; 408/239 A; 408/51

(58) Field of Classification Search ................ 409/232, 409/234; 408/239 A; 279/8, 83, 143, 145, 279/51

See application file for complete search history.

(56) References Cited

U.S. PATENT DOCUMENTS

| 3,041,898 | A | * | 7/1962 | Better | 408/238 |
| 4,133,545 | A | * | 1/1979 | Komori | 279/83 |
| 4,535,658 | A | * | 8/1985 | Molinari | 81/177.85 |
| 5,771,762 | A | * | 6/1998 | Bissett | 409/232 |

OTHER PUBLICATIONS

Prospekt "Schaublin—Spannzangen unde Werkzeughalter" (Extract from a catalogue C/82).
Catalogue "REGO-FIX AG" (Addition D86).
DIN 2079.

* cited by examiner

*Primary Examiner*—Dana Ross
(74) *Attorney, Agent, or Firm*—Emch, Schaffer, Schaub & Porcello Co., L.P.A.

(57) ABSTRACT

A tool support for fixed or rotating tools embodied with a collet chuck receiver for a collet chuck for clamping a tool shaft from the direction of the tool side. The collet chuck receiver has a tapering bore for receiving a collet chuck and a coaxial screw thread assigned to the bore for receiving a tensioning nut. In place of a collet chuck, a tool clamping insert is inserted with a tapering receiving neck into the tapering receiving bore, wherein the tool clamping insert is clamped in place by fastening means from the direction of the tool side.

21 Claims, 4 Drawing Sheets

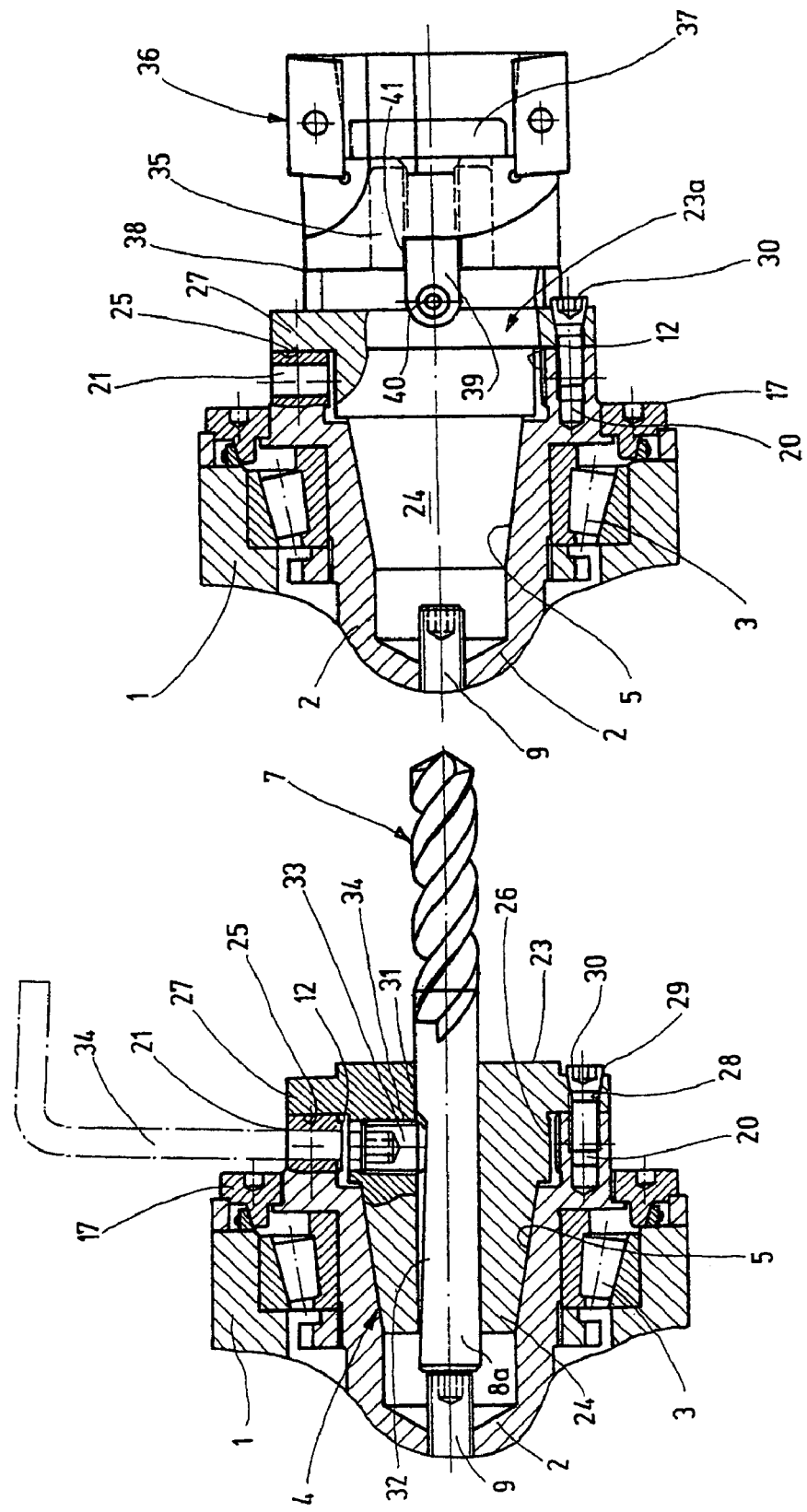

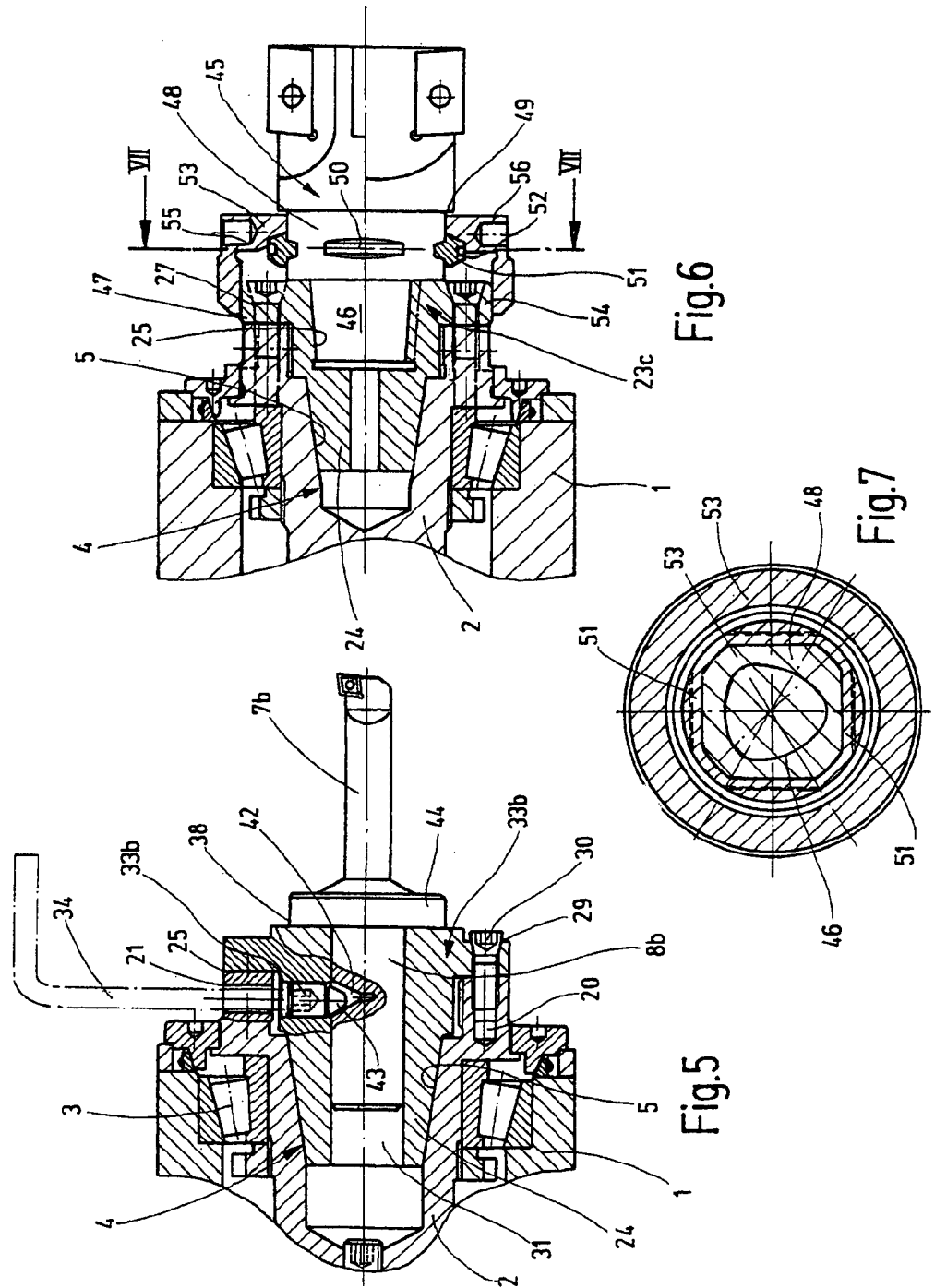

TOTAL SUPPORT WITH A COLLET CHUCK RECEIVER

CROSS REFERENCE TO RELATED APPLICATIONS

This patent application is a continuation of patent Ser. No.: 10/427,058, filed Apr. 30, 2003 now abandoned, which claims the benefit of German application No. 102 19 600.1 filed May 2, 2002.

TECHNICAL FIELD

The invention relates to a tool support for fixed or rotating tools, having a collet chuck receiver embodied on tool support means for a collet chuck used for clamping a tool shaft from the tool side. The collet chuck receiver has a tapering bore for receiving a collet chuck, and a coaxial screw thread assigned to the bore for receiving a tensioning nut.

BACKGROUND OF THE INVENTION

Citing a few examples, a tool support is here understood to be a spindle, a chuck, a drilling tool, or the like, in particular a tool holder in accordance with DIN 69880, such as is known in actual use in a multitude of embodiments for fixed and rotating tools. Tool holders with collet chuck receivers are described, for example, in German Utility Model 90 03 730, in EP 0 416 611 B1 and in DE 199 58 461 C1.

Collet chuck receivers and the associated collet chucks are standardized in accordance with DIN 6499. Among them are collet chuck receivers wherein the associated tensioning nut has an external screw thread or an internal screw thread. Collet chuck receivers and collet chucks are preferably employed for drilling purposes, but generally also in those cases where a very exact, clamping with close tolerances, in particular of tools with a cylindrical shaft, or also cylindrical workpieces, is important. Other, special receivers are mainly required for receiving face milling cutter, circular saw blades, disk milling tools and sawing-out tools, etc., however, such tools can also be clamped in collet chucks by means of appropriate receiver mandrels and receiver shafts. In case of extremely tight space conditions, such as exist for example in NC-controlled lathes with pivotable tool supports, frequently only those collet chuck receivers can be used, which have a tensioning nut with an external screw thread. The external screw thread of this tensioning nut is intended for being screwed into an internal screw thread associated with the tapering bore of the collet chuck receiver. But, especially because of the restricted space conditions, the manipulation, and in particular the tightening of such a tensioning nut is often comparably difficult and time-consuming. However, tool receivers of different construction as a rule have a greater space requirement than collet chuck receivers and can therefore often not be employed under restricted space conditions, for example in the case of tool holders. Similar also applies to clamping systems wherein the clamping of the tool shaft or the like takes place from the back, facing away from the tool side, for example by using a screw-thread spindle arranged in a work spindle. In the case of tool holders arranged on turret disks, clamping systems of this type can basically not be used.

SUMMARY OF THE INVENTION

The apparatus of the invention provides a tool support with an axially very short collet chuck receiver, which is designed in such a way that it is possible, even within the most restricted spaces, to also employ other tool receivers than a collet chuck. Thus a comfortable and effective clamping of the tools, etc. takes place from the tool side of the tool support.

For attaining this, the tool support has the characteristics as follows:

A first end face at the tool receiver means extending at right angles to the drill axis is assigned to the tapering bore, which is intended for receiving a collet chuck and is appropriately embodied for this purpose. Furthermore, fastening means for a tool clamping insert provided with a tapering receiving neck in place of a collet chuck and inserted in the tapering bore, are provided on the tool support means, wherein these fastening means are accessible from the tool side.

A tool support also is a subject of the invention. The tool support has a tool clamping insert, which has been inserted with a tapering receiving neck into the tapering bore and is releasably fastened on the tool support means by the fastening means. In this case the tool clamping insert has a second end face. When the tool clamping insert has been inserted into the tapering bore, the two end faces are held against each other without play by the fastening means.

The tool clamping insert has no, or only a very small additional space requirement in the axial direction. It can be embodied with a tool receiver suitable for a respective application purpose. A highly precise and exactly positionally correct alignment of the clamping insert and its tool receiver is assured by means of the receiving neck of the tool clamping insert, which is exactly matched to the tapering bore of the collet chuck receiver in the tool support means, and by means of the level contact of the two end faces with the tool support means and the tool clamping insert. But at the same time the collet chuck receiver as such remains unchanged in its shape, so that a collet chuck can also be inserted when required, in order to clamp a tool therein by means of the associated tensioning nut.

Usefully the fastening means of the clamping insert are arranged at the tool support means in areas of the first end face. They can have threaded bores which are arranged, axis-parallel in respect to the tapering bore, in the first end face.

In a practical embodiment at least one transverse bore can be provided in the tool support means, which extends transversely in respect to the axis of the tapering bore and through which the one clamping device on an tool clamping insert inserted into the collet chuck receiver is accessible from the outside. This tool clamping device can have a clamping screw, which is inserted into an appropriate threaded bore of the tool clamping insert and is accessible through the transverse bore.

With an alternative embodiment, the tool clamping insert can also be equipped to receive a quick-action change insert, which is inserted, for example with a shaft, into the clamping insert and is releasably connected with the clamping insert. A tensioning nut, which is screwed onto a corresponding external thread of the clamping insert, is advantageously used for clamping the tool and, in the case of a quick-action change insert, cooperates with a split ring provided at the quick-action change insert, which has been inserted into a corresponding annular groove or depression of the quick-action change insert.

A tool clamping insert is also a subject of the invention, having the features of claim 16 for use in a tool support as explained above in connection with the invention. Further developments and embodiments of the novel tool support and the novel tool clamping insert are the subject of the dependent claims.

BRIEF DESCRIPTION OF THE DRAWINGS

Exemplary embodiments of the subject of the invention are represented in the drawings. Shown are in.

DETAILED DESCRIPTION OF THE INVENTION

Figures 1, 2:
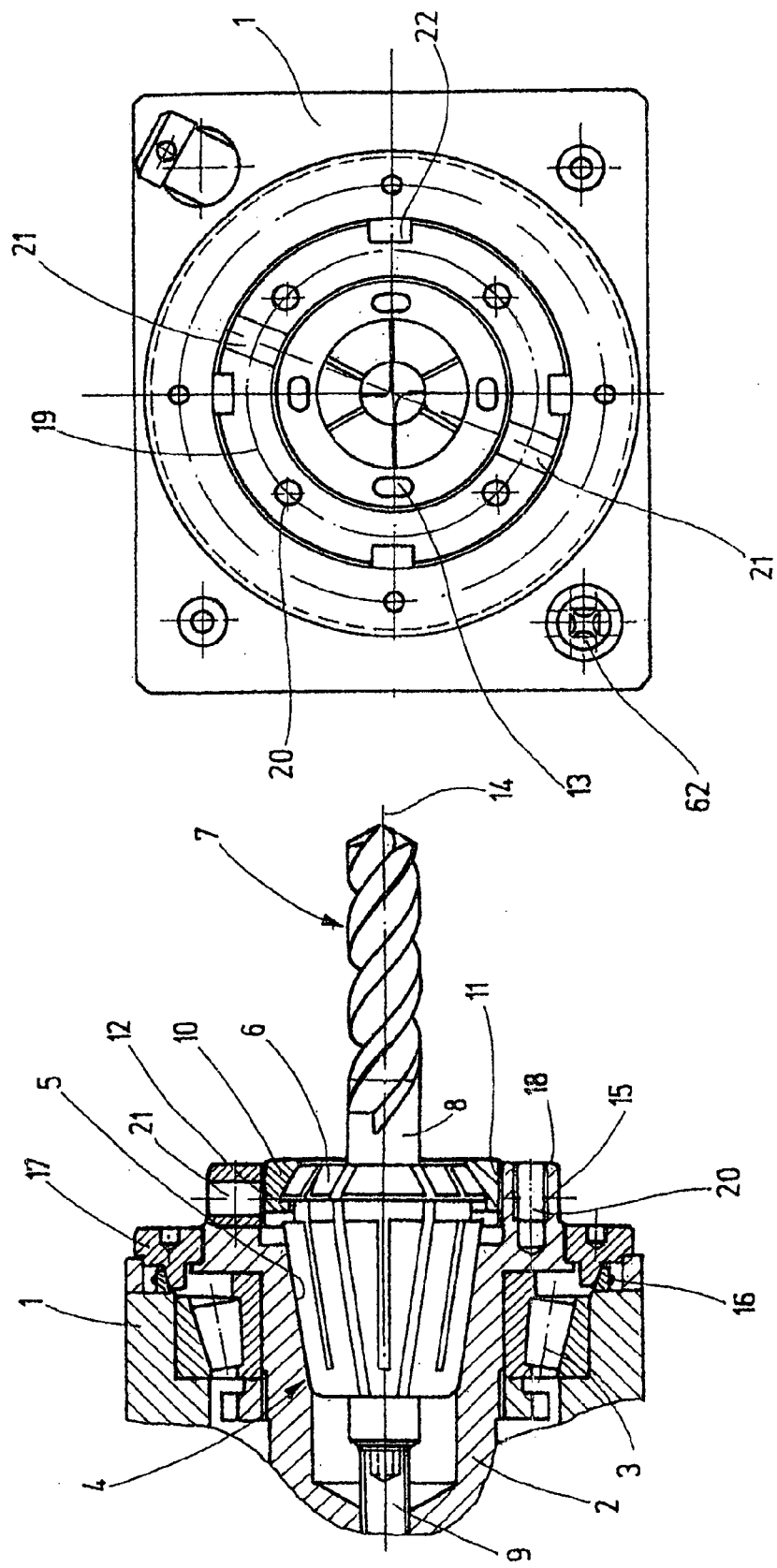
FIG. 1, a portion of a tool holder with a collet chuck receiver for a tool in axial section in a lateral view, FIG. 2, the tool holder in FIG. 1 in a plan view on the tool side, FIG. 3, the tool holder in FIG. 1, provided with a first embodiment of a tool clamping insert in accordance with the invention in a sectional presentation similar to FIG. 1, FIG. 4, the tool holder in FIG. 1, provided with a second embodiment of a tool clamping insert in accordance with the invention in a sectional presentation similar to FIG. 1, showing a tool clamping insert only partially cut open, FIG. 5, the tool holder in FIG. 1, provided with a third embodiment of a tool clamping insert in accordance with the invention in a similar sectional presentation, FIG. 6, the tool holder in FIG. 1, provided with a fourth embodiment of a tool clamping insert in accordance with the invention in a similar sectional presentation, FIG. 7, a view from above on the quick-action change insert of the tool holder in FIG. 6 along a section line VII—VII in FIG. 6, and FIGS. 8, 9, the tool holder in accordance with FIG. 2, respectively provided with a hooked wrench for fixing the spindle in place in one or another direction of rotation.

FIGS. 1, 2 illustrate a tool holder in section, or a plan view on the tool side which, in the represented embodiment, constitutes a tool support for rotating tools. The tool holder has a substantially parallelepipedal housing 1 in which a spindle 2, which constitutes a tool support means, is rotatably seated on rolling bearings 3. Regarding the structural details, known per se, of such tool holders, reference is made to DIN 69880, and DE 197 35 420 C2, as well as DE 199 58 461 C1, of Applicant.

The spindle 2 is provided with a collet chuck receiver 4 in accordance with DIN 4699. The collet chuck receiver 4 has a tapering bore 5 for receiving a collet chuck 6, which is also designed in accordance with DIN 6499. A tool 7 in the shape of a twist drill has been inserted into the collet chuck 6 with its cylindrical shaft 8, which is axially supported on a set screw 9, which has been screwed into the spindle 2 and is used as an adjustable axial stop. A tensioning nut 10 with an external screw thread 11 is used for clamping the collet chuck 6 and is screwed into a corresponding internal screw thread 12 of the spindle 2 from the direction of the tool side. The tensioning nut 10 cooperates via an inside located tapering face with a corresponding tapering face of the collet chuck 6, which is known per se, and otherwise corresponds to DIN 6499. On its front face facing the tool side, it is provided with blind bores 13 (FIG. 2), which are used for applying a face wrench, which makes it possible to tighten the tensioning screw 10 against the collet chuck 6, and in this way to clamp the shaft 8 of the tool 7 by means of the collet chuck 6. The internal screw thread 12, which is assigned to the tapering bore 5 and is coaxial in relation to it, is formed on the inside of a cylindrical extension 15 of the spindle 2, which is substantially tube-shaped and coaxial in relation to the bore axis 14, and whose cylindrical inner surface with the internal screw thread 12 adjoins the tapering bore 5 in the direction toward the tool side. The cylindrical extension 15 projects axially past the housing 1 and a sealing ring 17, which has been screwed onto the spindle 2 and sealingly closes off the housing 1 by means of a seal 16. On its front face facing the tool 7, it is provided with a finely worked level end face 18, which extends at exact right angles to the bore axis 14 and which will be called the first end face in what follows. As can be seen from FIGS. 1, 2, threaded bores 20, located on a common graduated circle 19, are provided on the cylindrical extension 15 inside the first end face 18 and constitute fastening means and are aligned axis-parallel with the bore axis 14. The threaded bores 20 are arranged evenly spaced apart from each other on the graduated circle. Radially extending transverse bores 21 are located between them, whose division is offset in respect to the division of the threaded bores and which penetrate through the cylindrical extension 15. The transverse bores 21, of which two diametrically oppositely located transverse bores are shown in the represented exemplary embodiment, are freely accessible from the outside and terminate in the area of the internal screw thread 12, as an examination of FIG. 3 shows.

For clamping tool shafts 8 of different diameters, the collet chuck 6 in FIGS. 1, 2 can be replaced by other collet chucks, which are adapted to the respective tool diameters. The employment of a tensioning nut 10 with an external screw thread 11 clearly permits an axially particularly short construction, wherein the tool holder can be employed even under very restricted space conditions, for example on a turret disk.

At the circumference of the cylindrical extension 15 of the spindle 2, evenly distributed on the exterior, four longitudinal grooves 22, which are rectangular in cross section, are arranged evenly distributed and are used for the engagement of a hooked wrench, for example in accordance with DIN 1810, which makes it possible to temporarily arrest the spindle 2, fixed against relative rotation, when tightening the tensioning nut 10. Alternatively to this it is also possible to advantageously employ a special embodiment of a hooked wrench for this purpose, which will be explained in what follows in connection with FIGS. 8, 9.

In order to be able to clamp tools which cannot be clamped by means of a collet chuck without making changes on the spindle 2 or the collet chuck receiver 4, a tool clamping insert 23 is used in accordance with the invention, which takes the place of the collect chuck 6 and is represented in different embodiments in FIGS. 3 to 7. These different embodiments are only exemplary embodiments, which should not be understood to be limiting. Depending on the respectively used clamping technique, the clamping inserts 23 can also be embodied with other tool receivers, known per se.

In all embodiments represented in FIGS. 3 to 7, the tool holder with its housing 1 and its spindle 2 is designed the same as in FIGS. 1 and 2. Parts identical to those in FIGS. 1, 2, are therefore provided with the same reference numerals and will not be explained again.

In the embodiment in accordance with FIG. 3, a clamping insert 23 is provided, which has a tapering receiving neck 24 on one side, which has substantially the same angle of taper as the tapering bore 5 in the spindle 2 and has been inserted in it with a bias. A second end face 25, which adjoins the receiving neck 24 via a cylindrical section 26, whose axial length is slightly less than the axial length of the tube-shaped extension of the spindle 2, is attached to the clamping insert 23 at right angles in relation to the longitudinal center axis of the receiving neck 24. The cylindrical section 26 has a diameter which is less than the interior diameter of the internal screw thread 12, so that, when the clamping insert 23 has been mounted in the collet chuck receiver 4, the circumferential surface of the cylindrical section 26 is at a radial distance from the internal screw thread 12, and the latter is not interfered with in the course of mounting the clamping insert 23.

On the side facing away from the receiving neck 24, the cylindrical section 26 is bordered by an annular flange 27, in which penetrating fastening bores 28 are formed, which are coaxial with the longitudinal center axis of the receiving neck 24, have the same division as the threaded bores 20 and are located on the same graduated circle 19 when the clamping insert 23 is mounted in the collet chuck receiver 4. The fastening bores 28 are provided with tapering spot-facings 29 and receive correspondingly tapering fastening screws 30 which, when the clamping insert 32 has been inserted, are screwed into the threaded bores 20. The fastening screws 30 which, together with the threaded bores 20, the fastening bores 28 and the spot-facings 29, form fastening means, press the second end face 25 formed at the annular flange 27 against the first end face 18 of the spindle 2 in a manner free of play, so that an exact alignment of the tool clamping insert 23 in relation to the spindle 2, and a positive connection with it is assured. Since the axial thickness of the annular flange is comparatively small, only a minimal additional space requirement for the tool clamping insert 23 results in comparison to FIG. 1. The tool clamping insert 23 contains a cylindrical tool receiver bore 31, into which the cylindrical shaft 8a of the tool 7 is inserted. The tool shaft 8a is provided with a clamping face 32, which is inclined toward the tool axis and on which a tensioning screw 33 acts, which constitutes a clamping device and is screwed into an assigned radial threaded bore 34. In one rotational position of the tool clamping insert 23, the threaded bore 34 is aligned with a bore 21 in the cylindrical extension 15 of the spindle 2, which allows the introduction of an Allen key 340 or—with an appropriate design of the tensioning screw 33—a screwdriver for tightening or loosening the tensioning screw 33, as represented by dashed lines in FIG. 3.

With the embodiment represented in FIG. 4, the basic construction of the tool clamping insert 23a is similar to the clamping insert 23 in FIG. 3. To that extent, identical parts are therefore provided with the same reference numerals. The tool clamping insert 23a, which is fastened on the spindle 2 in the same way as the clamping insert 23 by means of axial fastening screws 30, supports a coaxial cutter arbor 35 for receiving a shell-type milling cutter 36, which is fastened in a manner known per se by means of a milling cutter tightening screw 37.

An end face contact of the shell-type milling cutter 36 with a corresponding end face, accurate to size, of the annular flange 27 of the tool clamping insert 23a, is provided at 38. A driver 39, which is screwed to the tool clamping insert 23a at 40 and engages a corresponding radial clutch keyway 41 of the shell-type milling cutter 36, is used for coupling the shell-type milling cutter 36 with the tool clamping insert 23a, and therefore with the spindle 2, in a manner fixed against relative rotation.

An exemplary embodiment is represented in FIG. 5, in which the tool clamping insert 23b is basically designed similar to the tool clamping insert 23 of the embodiment in accordance with FIG. 3. Again, identical parts are provided with the same reference numerals and are not further explained. In this case, a boring tool 7b has been inserted with its cylindrical shaft 8b into the receiving bore 31 of the tool clamping insert 23b, which shaft has a radial tapering blind bore 42 at one location on its circumference, which is engaged by a tensioning screw 33b with a tapering clamping neck 43. In the way which can be seen in FIG. 5, the clamping neck 43 is slightly offset in the axial direction against the tool shaft 8b, which is axially supported via a flange 44 on the end face 38 of the tool clamping insert 23b, by means of which it is achieved that when the tensioning screw 33b is tightened, the tool shaft 8b is drawn into the receiving bore 31 with the result that a close level seating, free of play, of the flange 44 on the end face of the tool clamping insert 23b results at 38. Again, the operation of the tensioning screw 33b is provided by means of a hexagonal hooked wrench 34 or a screwdriver, which is inserted through the bore 21. This exemplary embodiment also shows that commercially available tool systems, which have certain advantages in connection with defined processing jobs, can be clamped with little effort in the existing collet chuck receiver 4 of the spindle 2 with minimal space requirements.

Finally, a further modified embodiment of a tool clamping insert 23c is illustrated in FIGS. 6, 7, whose basic structure also corresponds to the tool clamping insert 23 in accordance with FIG. 3. Therefore, identical parts are also provided with the same reference numerals and are not again explained. The tool clamping insert 23c is intended for receiving a milling cutter quick-action change insert 45. The quick-action change insert 45 has a coaxial receiver shaft 46, which is designed as a polygon in cross section and is fitted into a corresponding polygonal tool receiver 47 of the tool clamping insert 23c. A cylindrical section 48, which is bordered on its outer front face by a radial shoulder 49, adjoins the receiving shaft in the axial direction. The section 48 is provided with four even gripper grooves 50, which are engaged by the parts of a two-part ring 31, whose inner shape has been matched to the inner shape of the gripper grooves 50. The two parts of the split ring 51 are maintained in the gripper grooves 50 by an elastic element, for example a round cord ring 52.

A tensioning nut 53 embodied as a cap nut and screwed on a matching external screw thread 54 of the annular flange 27 of the tool clamping insert 23c acts on the split ring 51, which is delimited by conical faces on the outside.

The tensioning nut 53 presses the tool quick-action change insert 45 over the split ring 51 and the gripper grooves 50 and into the quick-action change receiver 47. Radial bores 53 provided in the tensioning nut 53 are used for the application of a hooked wrench for tightening the tensioning nut 53 on the annular flange 27.

When releasing the tensioning nut 53, it runs up with its front face 56 on the shoulder face 49 of the quick-action change insert 45 in the course of turning it out of the external screw thread 54, so that the insert is pushed out of the quick-action change receiver 47.

Inter alia, the gripper grooves 50 are used in a manner known per se for the application of a tool gripper during the automatic change of the quick-action change insert 45 when the latter is inserted into another tool receiver.

Figure 8:
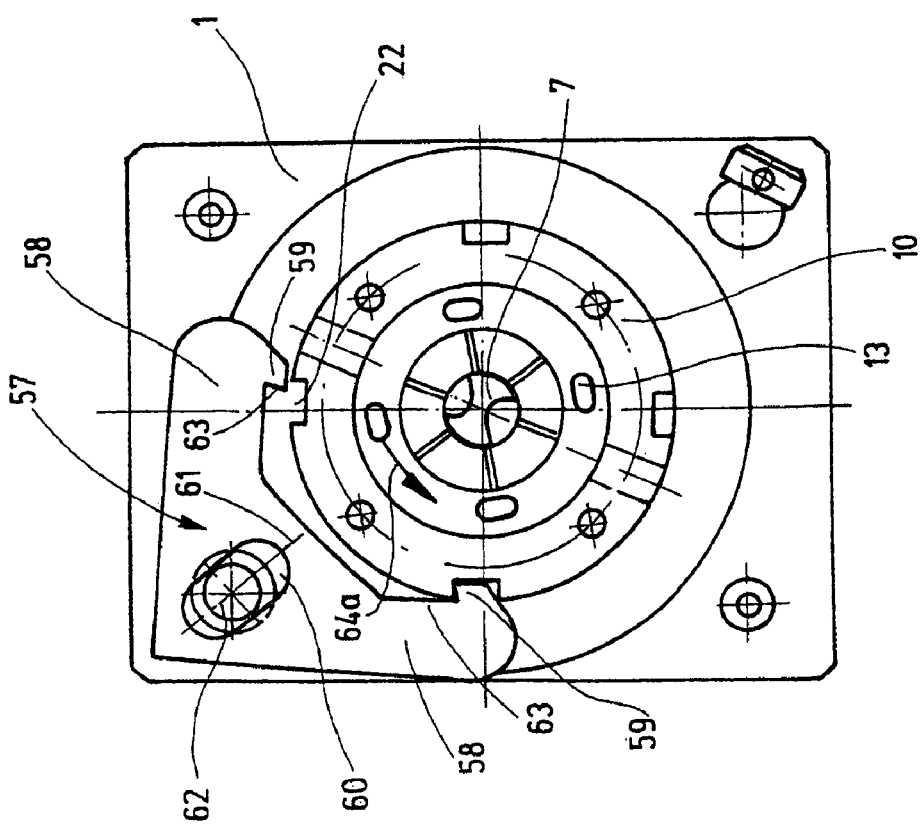

In the course of tightening the tensioning nut 53 for clamping the quick-action change insert 45, it is necessary to temporarily arrest the spindle 2 in a manner fixed against relative rotation. This applies in the same way also to the conditions during tightening the tensioning nut 10 with the external screw thread 11 if, as represented in FIG. 1, a collet chuck 6 is to be inserted into the collet chuck receiver 4 of the spindle 2. As already mentioned, it is possible to employ a hooked wrench in accordance with DIN 1810, which is inserted into one of the circumferential grooves 22 of the cylindrical extension 15 of the spindle 2. However, a considerable easing of the actuation of the tensioning nut 53, or 10 can be achieved by the use of a double-hooked wrench 57, such as illustrated in FIG. 8, 9 in connection with the arrangement in accordance with FIG. 2. The double-hooked wrench 57 has a substantially L-shaped form with two legs 58 extending at right angles in respect to each other, each of which has an inward pointing protrusion 59 at the end. An elongated hole 60 is provided symmetrically between the two legs 58, whose longitudinal axis is located on the bisecting line 61 of the right angle formed between the two legs 58. The double-hooked wrench 57 is placed with its elongated hole 60 on a threaded bolt 62, which is provided so that it projects past the level front face of the housing 1 of the tool holder. The distance between the two hook noses 59 is matched to the spacing of the circumferential grooves 22 of the cylindrical spindle extension 15 in such a way that only respectively one hook nose 59 engages the circumferential groove 22, while the other hook nose rests on the cylindrical circumferential surface of the extension 15, as can be seen in FIGS. 8, 9.

Figure 9:
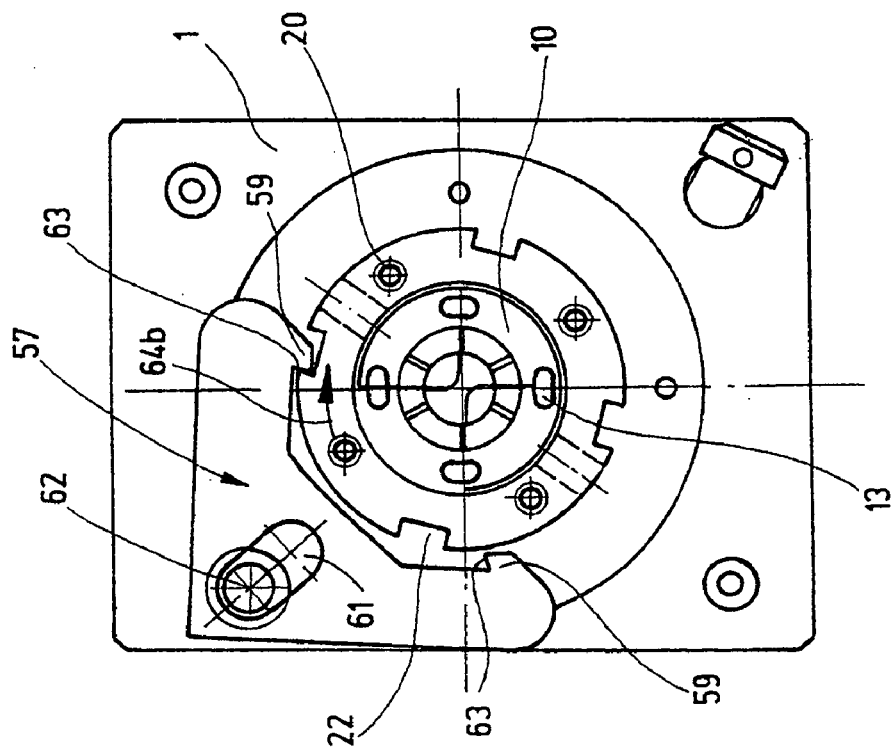

Depending on which of the two hook noses 59 engages one of the circumferential grooves 22 with a blocking face 63, the spindle 2 is arrested in the one or the other direction of rotation, which can be easily understood from FIGS. 8, 9, in which the direction of rotation of the spindle 2 in which the spindle has been arrested is indicated by the respective arrows 64*a* or 64*b*. Because of the lever forces exerted during clamping or releasing the tensioning nut 10 (or 53 in FIG. 6) on the threaded bolt 62, the double-hooked wrench 57 remains engaged in the associated circumferential groove 22 when the tensioning screw is actuated in a clockwise or counterclockwise direction, in particular if, as represented in FIG. 1, the tool holder is used in the horizontal operating position of the tool axis 14, so that the double-hooked wrench 57 lies on a vertical plane.

The particular advantage of the hooked wrench 57 is a result of the fact that both hands are free for actuating the tensioning nut 10 or 53. Because of this the tensioning nut can be evenly tightened or released. In this way the danger of injury by the slippage of the hooked wrench in a very sharp and oily environment is greatly prevented. The result of clamping is clearly improved by the even tightening of the tensioning nut 10 or 53.

The invention claimed is:

1. A tool support for fixed rotating tool, comprising:
   a tool support means (2) having a collet chuck receiver (4) embodied therein, wherein said collet chuck receiver (4) has a tapering bore (5) having a bore axis (14) defined therein;
   said tool support means (2) comprising an internal screw thread (12) coaxial to said bore axis (4) and adapted to receive a tensioning nut (10) with an external screw thread (11) to be screwed into said internal screw thread (12),
   a finely worked level first end face (18) at said tool support means (2) assigned to the tapering bore (5) and extending at right angles to said bore axis (14), said first end face (18) being located in an axial distance from said tapering bore (85);
   fastening means (20) on the tool support means (2) that are independent of said internal screw thread (12) for releasably fastening a tool clamping insert (23) having a tapering receiving neck (24) inserted into the tapering bore (5), in place of said collet chuck (6), of the tool support means (2)
   wherein the fastening means are accessible from a tool receiving side of said tool support means (2).

2. The tool support in accordance with claim 1, characterized in that the tool clamping insert (23) contains a tool shaft bore (31) into which the tool shaft (8) is inserted.

3. The tool support in accordance with claim 1 characterized in that the tool clamping insert (23) has a second end face (25) and that, with the tool clamping insert (23) inserted into the tapering bore (5), the two end faces (18, 25) are kept in contact with each other free of play by the fastening means (20).

4. The tool support in accordance with claim 3, characterized in that the tool clamping insert is designed for receiving a quick-action change insert (45), which is inserted with a shaft (46) into the clamping insert (23) and which is releasably connected with the clamping insert.

5. The tool support in accordance with claim 4, characterized in that the quick-action change insert (45) supports a split ring (51), which is acted upon by a tensioning nut (53) screwed onto a corresponding external screw thread (54) of the clamping insert (23).

6. The tool support in accordance with claim 1, characterized in that fastening means (20) are arranged in the area of the first end face (18).

7. The tool support in accordance with claim 6, characterized in that the fastening means have threaded bores (20), which are arranged axis-parallel in respect to the tapering bore (5) in the first end face (18).

8. The tool support in accordance with claim 1, characterized in that at least one transverse bore (21) extending transversely in respect to the axis (14) of the tapering bore (5) is provided in the tool support means, by means of which a clamping device (33) on a tool clamping insert (23) inserted into the collet chuck receiver is accessible from the outside.

9. The tool support in accordance with claim 8, characterized in that the tool clamping device has a tensioning screw (33), which is screwed into a corresponding threaded bore (34) of the tool clamping insert (23) and through which the transverse bore (21) is accessible.

10. The tool support in accordance with claim 9, characterized in that the tensioning screw (33*b*) has a tapering clamping neck (43).

11. The tool support in accordance with claim 1, characterized by at least one tool clamping device (33), which extends transversely to the axis of the receiving neck (24) and is arranged on the tool clamping insert (23) so it can be operated from the outside.

12. The support in accordance with claim 1, characterized in that the screw thread of the collet chuck receiver is an internal screw thread (12).

13. The tool support in accordance with claim 12, characterized in that the tool clamping insert (23), which has been inserted into the tapering bore (5), is radially set back in the area (26) of the internal screw thread (12) in respect to the tool support means.

14. The tool support in accordance with claim 1 wherein the tool shaft (8) includes a clamping face (32); wherein the tool support also includes an annular flange (27) against end face (18) and wherein the annular flange (27) a radial threaded bore (34) housing a tensioning screw (23) which may be tightened against clamping face (32).

15. The tool support in accordance with claim 1, characterized in that it is designed as a tool holder.

16. The tool support in accordance with claim 1, characterized in that the tool support means (2) have at least one recess (22) on their circumference for a hooked wrench to be placed against, and that stationary seating means (62) are arranged in the vicinity of the tool support means, on which a substantially L-shaped double-hooked wrench (57) is pivotably seated, which has two legs (58), each of which supports a blocking element (59) pointing inward, and that when a blocking element (59) of a leg (58) engages a recess (22), the blocking element (59) of the other leg (58) is maintained out of contact with a recess.

17. A double-hooked wrench in combination with the tool support defined in claim 16.

18. A tool clamping insert in combination with the tool support as defined in claim 1 comprising:
- a tapering receiving neck (24) which is adapted to be inserted into a tapering bore (85) of a collet chuck receiver (4),
- a second end face (25) extending at right angles in respect to a longitudinal central axis of said receiving neck,
- a radially protruding extension 927 on said clamping insert provided with said second end face (25) that is located on a side of said extension (27) that is facing toward said receiving neck (24) and
- means for maintaining said second end face (25) in contact with a first end face (18) of said collet chuck receiver (84) and for clamping it thereto.

19. A tool clamping insert in accordance with claim 18 characterized in that said means for maintaining said second end face (25) in contact with said first end face (18) of said collet chuck receiver (4) comprising throughgoing fastening bores (28) traversing said second end face (25) on said radially protruding extension (27), said fastening bores (28) being oriented in a parallel relationship to said receiving neck (24).

20. The tool clamping insert in accordance with claim 18 characterized in that it is arranged for receiving a tool quick-action change insert (45), and that the tool clamping device is a clamping device for the tool quick-action change insert (45).

21. The tool clamping insert in accordance with claim 20 characterized in that the clamping device has a tensioning nut (53) screwed onto a screw thread (54) of the tool clamping insert (23c), and that the tool quick-action change insert (45) supports a ring (51), on which the tensioning nut can be supported.

* * * * *